United States Patent [19]

Nordsiek et al.

[11] 3,903,030

[45] Sept. 2, 1975

[54] STABLE OIL-EXTENDED SYNTHETIC RUBBERS

[75] Inventors: Karl-Heinz Nordsiek; Johannes Schafer, both of Marl, Germany

[73] Assignee: Chemische Werke Huls Aktiengesellschaft, Marl, Germany

[22] Filed: May 2, 1968

[21] Appl. No.: 726,239

[30] Foreign Application Priority Data

May 8, 1967 Germany................................ 42256

[52] U.S. Cl... 260/23.7 M; 260/27 BB; 260/23.7 R; 260/32.6 A; 260/33.6 AQ; 260/45.75 R; 260/45.85 R; 260/45.9

[51] Int. Cl............................................. C08c 11/32

[58] Field of Search. 260/23.7 M, 33.6 AQ, 32.6 A, 260/45.75, 94.7 A, 94.7 N, 45.9, 27 BU, 45.85

[56] References Cited
UNITED STATES PATENTS

| | | | |
|---|---|---|---|
| 2,895,940 | 7/1959 | Tucker | 260/45.9 |
| 3,019,207 | 1/1962 | Crane | 260/33.6 |
| 3,081,276 | 3/1963 | Snyder et al. | 260/33.6 |
| 3,180,858 | 4/1965 | Farrar | 260/94.3 |
| 3,386,937 | 6/1968 | Amberg | 260/27 |
| 3,397,167 | 8/1968 | Gruver | 260/33.6 |
| 3,457,218 | 7/1969 | Haas et al. | 260/45.8 |
| 3,459,831 | 8/1969 | Luftglass et al. | 260/33.6 X |
| 3,497,489 | 2/1970 | Saltman et al. | 260/94.7 X |
| 3,501,422 | 3/1970 | Nordsick et al. | 260/23.7 X |

*Primary Examiner*—Eugene C. Rzucidlo
*Attorney, Agent, or Firm*—Millen, Raptes & White

[57] ABSTRACT

To improve the storage stability and degradation resistance of oil-extended solution-polymerized polymers of butadiene or isoprene, there is added 0.1 – 7 parts by weight based on the weight of rubber solids, of a proton acceptor, for example, benzidene, magnesium oxide, calcium stearate, sodium abietate, p,p'-diamino-diphenyl methane, and the like.

13 Claims, No Drawings

STABLE OIL-EXTENDED SYNTHETIC RUBBERS

BACKGROUND OF THE INVENTION

This invention relates to oil-extended rubbers, particularly to solution-polymerized polymers of isoprene or butadiene.

Prior to vulcanization, oil-extended synthetic rubbers normally suffer considerable molecular weight degradation during conventional processing and storage conditions. In this connection, insufficient storage stability has been a particular problem. Thus, several attempts have been made to solve this problem by employing a greater quantity of those additives conventionally used as stabilizers for rubber, such as, for example, secondary arylamines or sterically hindered phenols. Unfortunately, it was soon discovered that these additives were not only unsuccessful, but they even increased the tendency of the rubber to degrade, this phenomenon being especially evident in the case of solution-polymerized polymers.

Bearing in mind that a marked decrease in the average molecular weight of the elastomer in the presence of extended oils, taking place during the course of storage and processing, is reflected in the corresponding fall off in the properties of the final vulcanizate, the importance of the problem is readily apparent.

SUMMARY OF THE INVENTION

An object of this invention, in view of the background just presented, is to provide oil-extended synthetic rubber, principally solution polymerized polymers of butadiene or isoprene, having improved storage stability and/or resistance to molecular weight degradation at above ambient temperature during processing.

Another object is to provide processes for producing such rubber.

Upon further study of the specification and appended claims other objects and advantages of this invention will become apparent.

To attain the above objects, an unexpectedly simple solution has been discovered which is merely to add to the oil or the rubber-oil mixture an effective degradation-decreasing amount, preferably 0.1 – 7.0 parts by weight, based on 100 parts by weight of the solid rubber of a proton acceptor.

DETAILED DISCUSSION OF THE INVENTION

Rubbers especially benefited by the invention because of their otherwise substantial degradation during storage or processing after being mixed with mineral oil plasticizers are particularly the high-cis-containing polybutadienes and polyisoprenes produced in solution, having a content of 1,4-cis-configuration of, e.g., 30 – 100%, preferably above 40%. In addition, this invention is advantageous for the production of solution-polymerized copolymers of butadiene and isoprene in all proportions, as well as copolymers of the aforesaid monomers with not more than about 40% by weight styrene. Aside from high-cis polymers and copolymers, this invention is also applicable to low-cis polymers and copolymers, for example, as produced on the basis of alkali metals, organometallic compounds, or redox systems in solution. Processes for producing both high-cis and low-cis polymers are well described in the literature, for example, G. Natta, Chimica e Industria 39 (1957), 733; R. F. Dunbrook et al., Proc. Rubber Technol. Conference, London 1954, page 139.

The oils conventionally employed for extending rubbers are mineral oil plasticizers, representing petroleum distillates, raffinates, and refining extracts. Preferred compounds, in this connection, are those having a predominant content of aromatic or naphthenic hydrocarbons, as described in the literature, for example, H. A. Munderloh, Kautschuk and Gummi 12 (1959) WT 246.

The weight of oil amounts to about 10 – 70, preferably 20 – 50 parts by weight, based on the weight of 100 parts of solid rubber under consideration.

The usual rubber additives can be added to the mixture, including, but not limited to, agents for terminating the polymerization (shortstops), and conventional stabilizers.

The term proton acceptor is explained by the general definition of G. N. Lewis (all substances containing unshared electron pairs are bases). Especially suitable are oxides and hydroxides of the alkali and alkaline earth metals, as well as those of zinc and aluminum. The more common alkali and alkaline earth metals are: lithium, sodium, potassium, beryllium magnesium, calcium, strontium, and barium.

The preferred dosage, in this connection, is 0.1 – 7.0 parts, particularly above 0.5 parts, and advantageously 2 – 5 parts by weight, based on 100 parts by weight of the proportion of solid rubber contained in the rubber-oil mixture.

Aside from the inorganic proton acceptors, it also is beneficial to employ organic proton acceptors. Thus, rubber soluble primary amines of 2 – 20 carbon atoms are also suitable, for example, all saturated and unsaturated aliphatic and cycloaliphatic amines, mono- and polynuclear arylamines, and alkanolamines. In addition, there can be employed quaternary ammonium bases of tertiary aliphatic and cycloaliphatic amines of 4 – 15 carbon atoms, e.g., tetramethylammonium hydroxide or N-methylpiperidine hydroxide.

It is preferred to employ primary arylamines such as aniline, p-phenylenediamine, benzidine, p,p'-diamino-diphenyl-methane, naphthylamines, as well as the isomers and derivatives thereof. However, additionally suitable are certain aliphatic amines, such as, e.g., hexamethylenediamine, or heterocyclics, such as pyridine and piperidine. In connection with the solubility in the rubber phase, the dosage, in this instance, is sufficient at 0.1 – 5 parts by weight, based on the solid rubber. General speaking suitable amines are those having a good solubility in the rubbery material, being slightly volatilized by steam treatment, and also water-insoluble.

It is furthermore possible to employ the alcoholates from alkali as well as alkaline earth metals and primary alcohols of 1 – 12 carbon atoms.

Finally, alkaline-hydrolyzable salts of organic acids can be employed with an especially advantageous effect, not only because of their stabilizing activity, but also because of other favorable effects on the rubber processing procedure. Predominantly suitable for this purpose are the alkali, alkaline earth, as well as zinc and aluminum salts of saturated and unsaturated carboxylic acids of 2 – 20 carbon atoms, particularly hydrocarbon carboxylic acids, especially higher fatty acids, such as stearic, palmitic, lauric, oleic and linoleic acid, as well as mixtures thereof.

Particularly preferred in this respect are the same salts of the rosin acids used in emulsion polymerization, and generally recognized as being advantageous, reference being directed to U.S. Pat. Nos. 2,450,416, 2,484,616, 2,569,448, 2,569,449 and 2,648,657 — Hercules Powder Co.

The preferred dosages of the aforesaid salts range from 0.1 – 7 parts by weight, based on the proportion of solid rubber.

Important for obtaining the above-described stabilizing effect is the time of introducing the proton acceptors during the production of the rubber-oil mixture. Normally, the respective proton acceptor — dissolved in an organic solvent inert with respect to the catalyst, or also in the form of a slurry — is metered into the rubber solution (before the rubber is precipitated) either before or after the extender oil is added. Another technique is to mix the proton acceptor with the extender oil before it is added to the rubber.

The stabilizing effect which is best by far is obtained when adding the proton acceptor — as early as possible — to the polymerization charge. In this connection, the proton acceptor can serve simultaneously as the stabilizer and shortstop for the polymerization or molecular weight (Mooney) jump reaction, so that the requirement for a conventional shortstop is eliminated. In this connection, it is preferred for the proton acceptor to be previously dissolved in the inert solvent employed during the polymerization and then added in the form of such solution. By this technique, the purification of the solvent, which is recycled and reused for the polymerization, is simplified, since the separation of an additional shortstop, e.g., methanol, is eliminated. Under these conditions, amounts of proton-acceptor as low as 0.1 – 0.75 parts by weight of the rubber solids are completely sufficient. Although, during the subsequent hydrolysis, the solution of the rubber-oil mixture has a clearly acidic reaction, the stability previously induced by the portion acceptor is not significantly diminished if at all. Finally, though it is possible to admix the proton acceptor by means of rolls or an internal mixer to the finished oil-rubber after working and drying, this procedure is less preferred since some degradation may even occur during the admixing.

The conventional process steps of working up the product, as well as perhaps the further addition of conventional stabilizers, removal of solvents, separation of granules from the granule/water dispersion, as well as preliminary dewatering and drying of the granules, are conducted in the conventional manner.

In general, it is desirable for the polymers or copolymers to have ML-4 values of about 30 to 150. Accordingly, when proton acceptor "shortstop" agents are added to the polymerization reactor, this should be taken into consideration.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLES 1 to 7

The examples are effectively set forth in the following table.

After the polymerization process is terminated, the additives set forth in the vertical column II of the table are mixed into the solution of 1,4-cis-polybutadiene, together with 37.5 parts of extender oil having a major proportion by weight of aromatic compounds. The rubber obtained after working up and drying exhibits, is tested by several stability tests, as listed in the table, and compared to the control rubber not modified by the proton acceptor.

The control sample, prepared in accordance with conventional processes, containing a non-discoloring anti-aging substance of the sterically-hindered phenol type, specifically 2,2'-methylene-bis-(4-methyl-6-tert.-butyl-phenol) exhibits, under all of the test conditions, a decrease in Mooney viscosity of about 35% of the initial value. In comparison, by the use of the proton acceptor according to this invention, the molecular weight of the rubber is not significantly decreased.

TABLE

| I Ex. No. | II Synthetic Rubber | III Addition of (a) Type | Proton Acceptors (b) Amount Parts by Weight | (c) Manner of Use | IV Starting ML-4 | V ML-4 After Roll Treatment 10' at 150°C | VI ML-4 After 8 hrs of Storage at 120°C | VII ML-4 After 28 days of Storage at 70°C | Remarks |
|---|---|---|---|---|---|---|---|---|---|
| 1 | cis-1,4-polybutadiene + | — | — | — | 40 | 13 | 16 | 15 | A |
| 2 | " | Benzidine | 4 | dissolved in benzene | 46 | 36 | 46 | 45 | |
| 3 | " | Magnesium oxide | 7 | slurried in benzene | 40 | 34 | 39 | 38 | |
| 4 | " | Calcium Stearate | 1.2 | slurried in benzene | 40 | — | 38 | 37 | |
| 5 | " | Sodium abietate | 0.7 | paste with 30% water | 35 | — | 29 | 35 | |
| 6 | " | p,p'-di-amino-diphenyl-methane | 0.3 | dissolved in benzene | 47 | 47 | 47 | 43 | B |
| 7 | " | Na-abietate | 0.3 | dissolved in benzene | 32 | 20 | 28 | 27 | B |
| 8 | " | Na-Methylate | 0.3 | In form of a slurrry in benzene | 35 | 30 | 35 | 35 | |
| 9 | " ++ | Di-propylene triamine | 0.2 | Dissolved in benzene | 40 | 35 | 39 | 40 | C |

+ — Stabilized with a non-discoloring anti-aging substance, and containing 37.5 parts plasticizer oil per 100 parts solid rubber.
++ — Non-discoloring anti-aging substance not employed.
A — Comparative Example
B — The polymerization is stopped by adding IIIa.
C — The polymerization is stopped by adding the amine.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:
1. In a process comprising
   1. solution-polymerizing a monomer to form a rubber having 30–100% cis-configuration, said rubber being selected from the group consisting of polybutadiene and polyisoprene, admixing thereto 10–70 parts oil per 100 parts solid rubber to form an oil-extended rubber composition, and precipitating the oil-extended rubber from solution; and
   2. storing the composition;
   the improvement comprising dispersing in a solvent 0.1–7 parts by weight of a proton acceptor based on 100 parts by weight of said solid rubber, and adding resultant dispersion to the rubber during polymerization and before said oil-extended rubber is precipitated from solution in step (1), said proton acceptor being a shortstop agent whereby the storage stability and degradation resistance of the rubber is substantially improved, and additional separate shortstop agent is not added to the polymerization milieu, said proton acceptor being
   A. a salt of an alkali metal, an alkaline earth metal, zinc or aluminum, the anion being of a carboxylic acid or 2–20 carbon atoms or a rosin acid;
   B. an amine consisting essentially of a primary aromatic or aliphatic amine of 2–20 carbon atoms and not more than 3 nitrogen atoms and not more than 2 primary amino groups, said amine being soluble in rubber to the extent of at least 0.1–0.75 parts by weight of the rubber solids, being slightly volatilized by steam treatment and being water-insoluble; or
   C. a quaternary ammonium base of an aliphatic or cycloaliphatic tertiary amine of 4–15 carbon atoms.

2. A process as defined by claim 1 wherein said proton acceptor is a salt of an alkali metal, an alkaline earth metal, zinc or aluminum, the anion being of a carboxylic acid of 2–20 carbon atoms or a rosin acid.

3. A process as defined by claim 1 wherein said proton acceptor is a primary aromatic or aliphatic amine of 2–20 carbon atoms.

4. A process as defined by claim 1 wherein said proton acceptor is a quaternary ammonium base of an aliphatic or cycloaliphatic tertiary amine of 4–15 carbon atoms.

5. A process as defined by claim 1 wherein said rubber is polybutadiene.

6. A process as defined by claim 1 wherein said proton acceptor is selected from the group consisting of benzidine, calcium stearate, sodium abietate, and p,p'-diamino-diphenyl-methane.

7. A process as defined by claim 1 wherein said proton acceptor is an aliphatic amine of 2–20 carbon atoms.

8. A process as defined by claim 1 wherein said proton acceptor is benzidine.

9. A proces as defined by claim 1 wherein said proton acceptor is calcium stearate.

10. A process as defined by claim 1 wherein said proton acceptor is sodium abietate.

11. A process as defined by claim 1 wherein said proton acceptor is p,p'-diamino-diphenyl-methane.

12. A process as defined by claim 1 wherein said aliphatic amine is hexamethylene diamine or dipropylene triamine.

13. A vulcanizable composition comprising an intimate mixture of
   a. an oil-extended, solution-polymerized rubber having 30–100% cis-configuration, said rubber being selected from the group consisting of polybutadiene and polyisoprene and containing 10–70 parts oil per 100 parts solid rubber; and
   b. 0.1 – 7 parts by weight of a proton acceptor based on 100 parts by weight solid rubber, said proton acceptor being benzidine, p,p'-diamino-diphenyl methane, or
   a quaternary ammonium base of an aliphatic or cycloaliphatic tertiary amine of 4–15 carbon atoms.

* * * * *